(12) United States Patent
Cadima et al.

(10) Patent No.: US 8,587,444 B2
(45) Date of Patent: Nov. 19, 2013

(54) METHOD AND APPARATUS FOR COOKING APPLIANCE HEATING ELEMENT AND CONTROL IDENTIFICATION

(75) Inventors: Paul Bryan Cadima, Prospect, KY (US); James Carter Bach, Seymour, IN (US)

(73) Assignee: General Electric Company, Schenectady, NY (US)

( * ) Notice: Subject to any disclaimer, the term of this patent is extended or adjusted under 35 U.S.C. 154(b) by 55 days.

(21) Appl. No.: 12/980,490

(22) Filed: Dec. 29, 2010

(65) Prior Publication Data

US 2012/0171343 A1 Jul. 5, 2012

(51) Int. Cl.
*G08B 17/10* (2006.01)
*A47J 37/00* (2006.01)

(52) U.S. Cl.
USPC ........................................ 340/634; 126/388.1

(58) Field of Classification Search
USPC .......................................................... 426/520
See application file for complete search history.

(56) References Cited

U.S. PATENT DOCUMENTS

| 7,527,072 | B2 | 5/2009 | Crnkovich | |
|---|---|---|---|---|
| 2002/0073985 | A1* | 6/2002 | Leukhardt et al. | 126/39 E |
| 2003/0161490 | A1* | 8/2003 | Maase | 381/110 |
| 2007/0243495 | A1* | 10/2007 | Crnkovich et al. | 431/18 |
| 2008/0099557 | A1* | 5/2008 | James | 235/385 |

* cited by examiner

*Primary Examiner* — Brian Zimmerman
*Assistant Examiner* — Cal Eustaquio
(74) *Attorney, Agent, or Firm* — Dority & Manning, P.A.

(57) ABSTRACT

A method and apparatus are provided for determining which heating element on a cooking appliance is associated with a particular heating element control. More particularly, when a user of the appliance touches a control on the cooking appliance and/or comes in close proximity to such control, a visual identification of which heating element is associated with such control is provided. The visual identification can be e.g., a light that illuminates the associated heating element or a visible display that otherwise indicates the associated heating element.

16 Claims, 4 Drawing Sheets

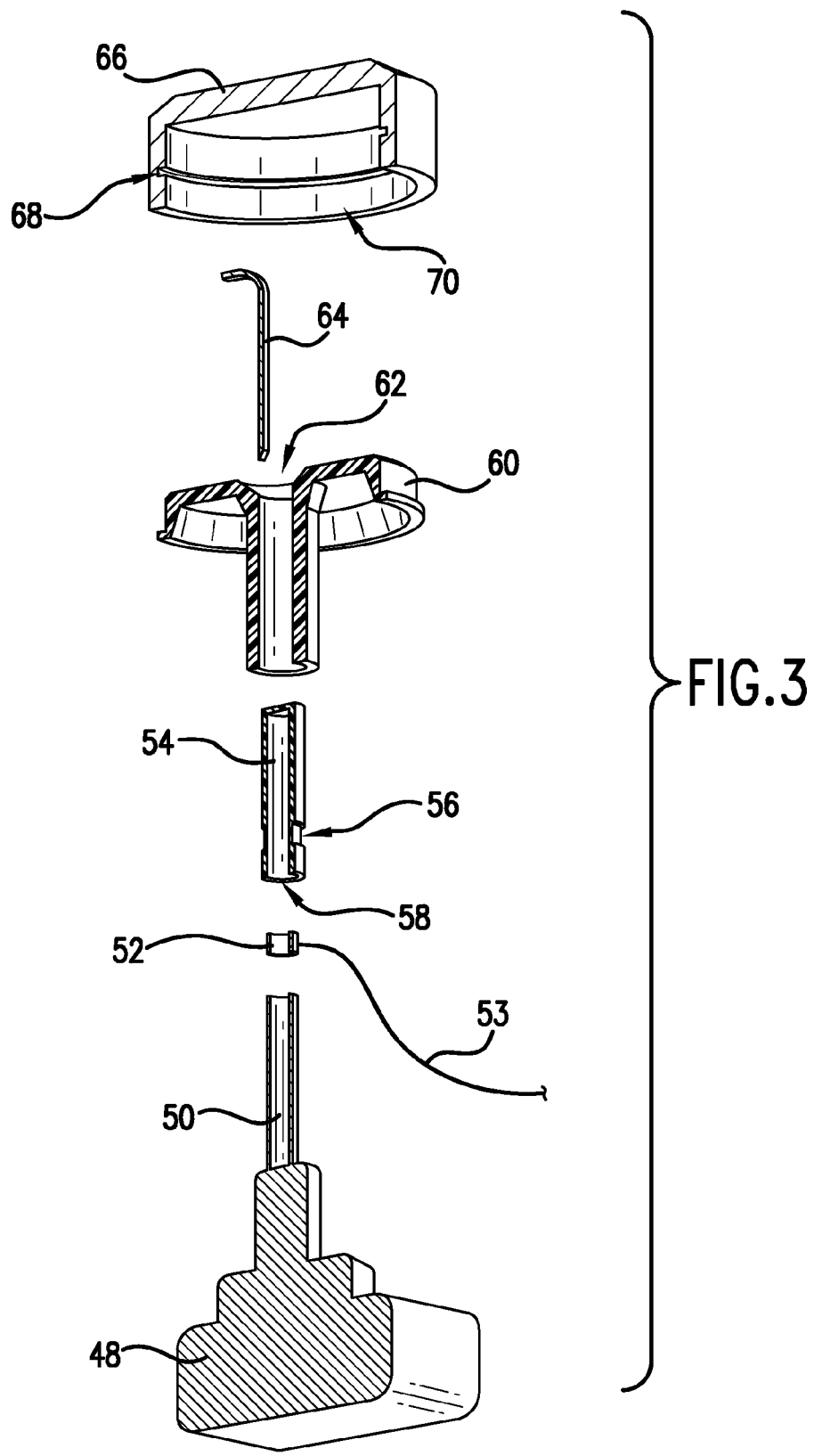

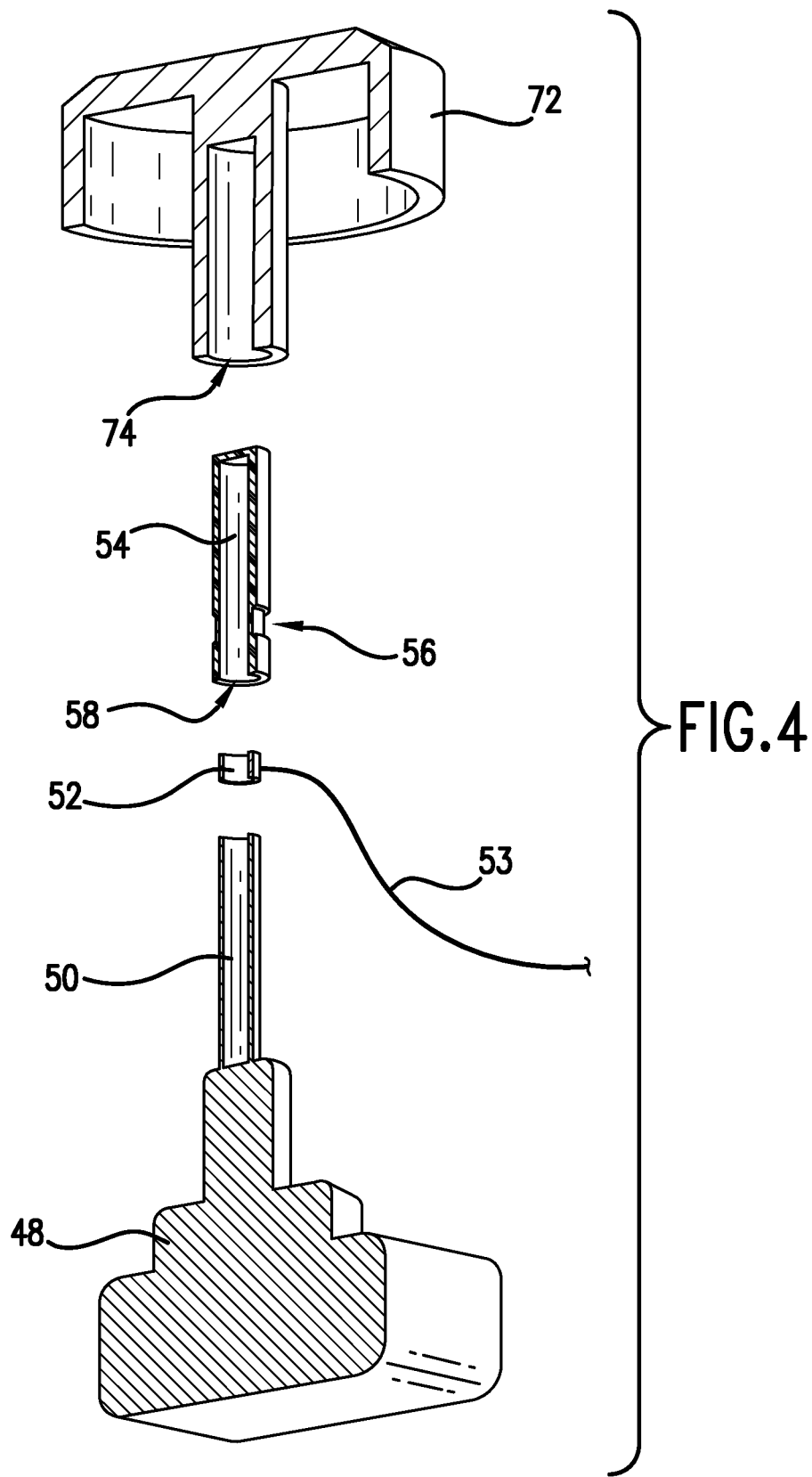

METHOD AND APPARATUS FOR COOKING APPLIANCE HEATING ELEMENT AND CONTROL IDENTIFICATION

FIELD OF THE INVENTION

The present invention relates to a method and apparatus for identification of which heating element on a cooking appliance is associated with a particular control for such heating element.

BACKGROUND OF THE INVENTION

Modern cook-top appliances typically include multiple heating elements such as e.g., gas burners that are positioned along a horizontal surface where cooking utensils may be placed for the cooking of various food items. Such heating elements can vary both in number and positioning about the cook-top. For example, four heating elements may be positioned in symmetrical or square-type configuration. Alternatively, the cook-top may include five heating elements placed somewhat randomly across the cook-top. Other configurations may be used as well.

The operation of the heating elements is typically controlled by multiple knobs that can be located either on the horizontal surface of the cook-top, along a vertical panel positioned at the front of the cook-top in a manner that provides access to the user, or along a backsplash positioned towards the rear of the appliance. Each heating element is subject to control by e.g., a knob that is rotatable to switch the heating element between off and on states and also to control the amount of heat produced based on the rotatable position of the knob. In some applications, the knob may include a click or push-in feature that provides additional resistance when moving the knob from an off to on state.

The knobs and/or adjacent surface may be provided with various indicia to show not only the heat setting of a heating element but also to identify the specific heating element with which a particular knob is associated. Nevertheless, even with such indicia, a user can become mistaken or confused in determining which knob is associated with which heating element. This can be particularly true when the knobs are placed on a vertical panel and/or multiple heating elements are positioned on the cook-top. Alternatively, a user simply may not be willing to examine the identifying indicia for various reasons. Regardless, this can sometimes lead to an approach, particularly with gas burning cook-tops, where the user simply begins trying different controls (i.e. turning knobs) until e.g., the desired burner is ignited and a flame is observed.

Accordingly, a method and apparatus for identifying which heating element is associated with a particular control on a cooking appliance such as a stove or cook-top would be useful. More particularly, a system that can detect the presence of a user (e.g., a user's finger) near a particular control and then provide a visible signal clearly identifying the heating element associated with such control would be beneficial. Such a system that can also incorporate a variety of techniques for detecting the presence of the user near the control would also be useful.

BRIEF DESCRIPTION OF THE INVENTION

Aspects and advantages of the invention will be set forth in part in the following description, or may be obvious from the description, or may be learned through practice of the invention.

For example, in one exemplary embodiment, the present invention provides an appliance for cooking Such appliance includes a heating element positioned upon a top surface. A control element is associated with the heating element and is configured for selective adjustment of the heating element. A visual indicator is placed adjacent to the heating element. A sensor is configured to activate the visual indicator upon detecting the presence of a user at the control element, so as to identify such heating element as being associated with such control element.

In still another aspect of the present invention, a method of operation for a cooking appliance is provided. The cooking appliance has multiple heating elements and multiple control elements, each control element is associated with a respective heating element. The steps of the method include detecting the presence of a user at one of the control elements; and identifying the corresponding heating element associated with the control element at which the user's presence is detected using a visible signal that is located at the corresponding heating element.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 provides an exploded view of a valve and control assembly as can be used in exemplary embodiments of the present invention.

FIG. 4 provides an exploded view of another valve and control assembly as can be used in exemplary embodiments of the present invention.

DETAILED DESCRIPTION OF THE INVENTION

Figure 1:
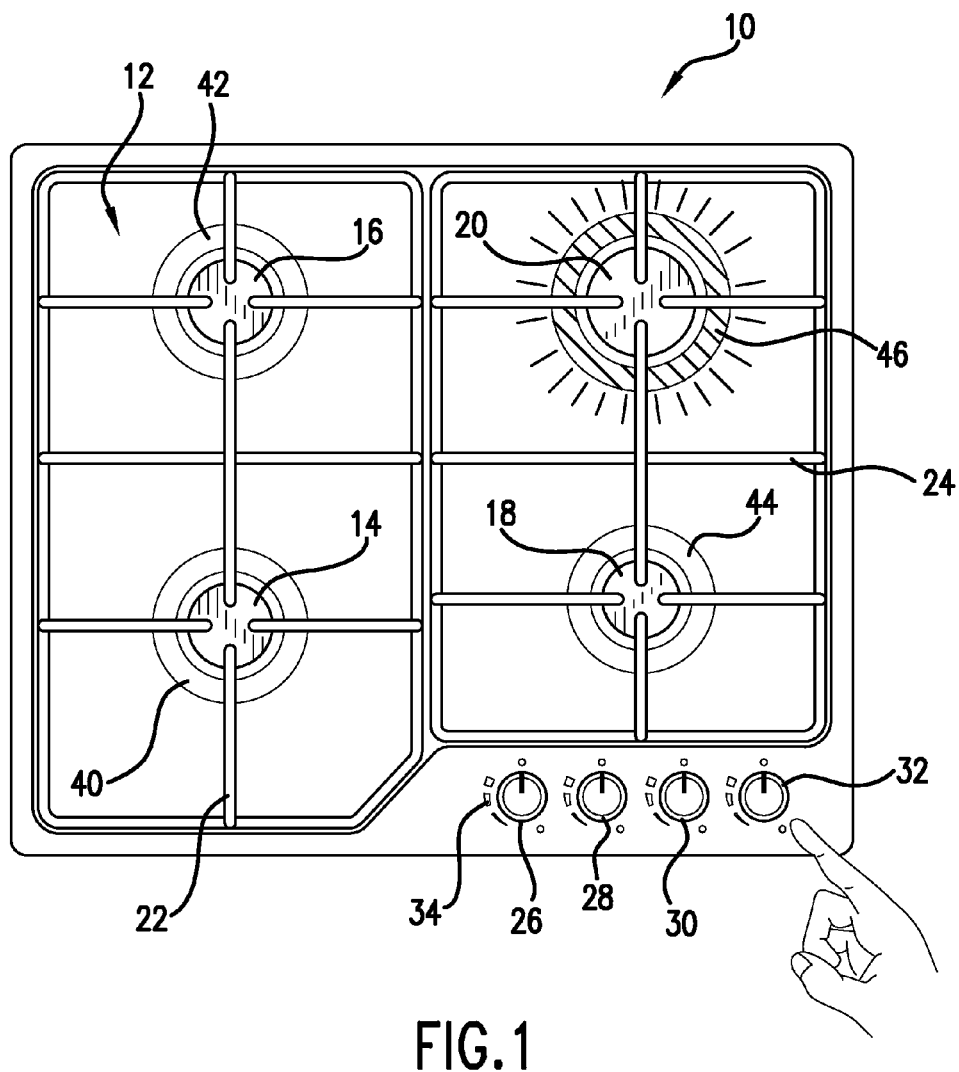
FIG. 1 provides a top view of the horizontal surface of a gas cook top appliance according to an exemplary embodiment of the present invention.

The present invention provides a method and apparatus for identification of which heating element on a cooking appliance is associated with a particular heating element control. More particularly, when a user of the appliance touches a control on the cooking appliance and/or comes in close proximity to such control, a visual identification of which heating element is associated with such control is provided. The visual identification can be e.g., a light that illuminates the associated heating element or a display that otherwise indicates the associated heating element. Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides an exemplary embodiment of a cook-top appliance 10 of the present invention. Cook-top 10 could be e.g., installed into the cabinetry of a kitchen and could be associated with one or more ovens. Cook-top 10 includes a horizontal surface 12 on which a plurality of heating elements—here burners 14, 16, 18, and 20—are located. Burner grates 22 and 24 provide support for cooking utensils placed thereon for the heating and cooking of food. Burners 14, 16, 18, and 20 are associated with controls 26, 28, 30, and 32, respectively.

Cook-top 10 is provided by way of example only. The present invention may be used with other cooking appliances having heating elements positioned upon a surface for which it is desired to provide for the positive identification of which heating element is associated with a particular control. Accordingly, the present invention may be used with a cook-top having e.g., a different number and/or positioning of burners 14, 16, 18, and 20.

In addition, controls 26, 28, 30 and 32 may be mounted in other configurations and locations other than as shown in FIG. 1. For example, controls 26, 28, 30 and 32 may be positioned on a vertical surface positioned near a front side of cook-top 10 where e.g., the user would be located during operation. Additionally, while the present invention is shown with burners 14, 16, 18, and 20 that are supplied with a gaseous fuel, the present invention may also be used with other types of heating elements as well such as e.g., electric coils.

As stated, burners 14, 16, 18, and 20 are associated with controls 26, 28, 30, and 32. More particularly, control 26 allows for the selective adjustment or control of burner 14 in that control 26 can activate or turn on burner 14 as well as control the amount of heat produced by burner 14. In the case of an appliance 10 based on gaseous fuel, control 26 may include a valve while in the case of an electric heating element, control may be e.g., a rheostat. Similarly, burners 16, 18, and 20 are selectively adjusted by controls 28, 30, and 32. Indicia 34 are provided with each control 26, 28, 30, and 32 to provide a simple indication of the rotatable position of a particular control and, therefore, whether such control is turned on and to what extent.

For this exemplary embodiment, visual indicators 40, 42, 44, and 46 each comprise a light source that surrounds a respective burner 14, 16, 18, and 20. Each visual indicator 40, 42, 44, and 46 provides a visible signal when a sensor (not shown) detects the presence of a user at one or more of controls 26, 28, 30, or 32. More particularly, as shown in FIG. 1, when the user's hand is detected at control 32, visual indicator 46 is activated to provide a visible notification to the user that burner 20 is associated with control 32. Visual indicators 42, 44, and 46 operate similarly for controls 28, 30, and 32.

Figure 2:
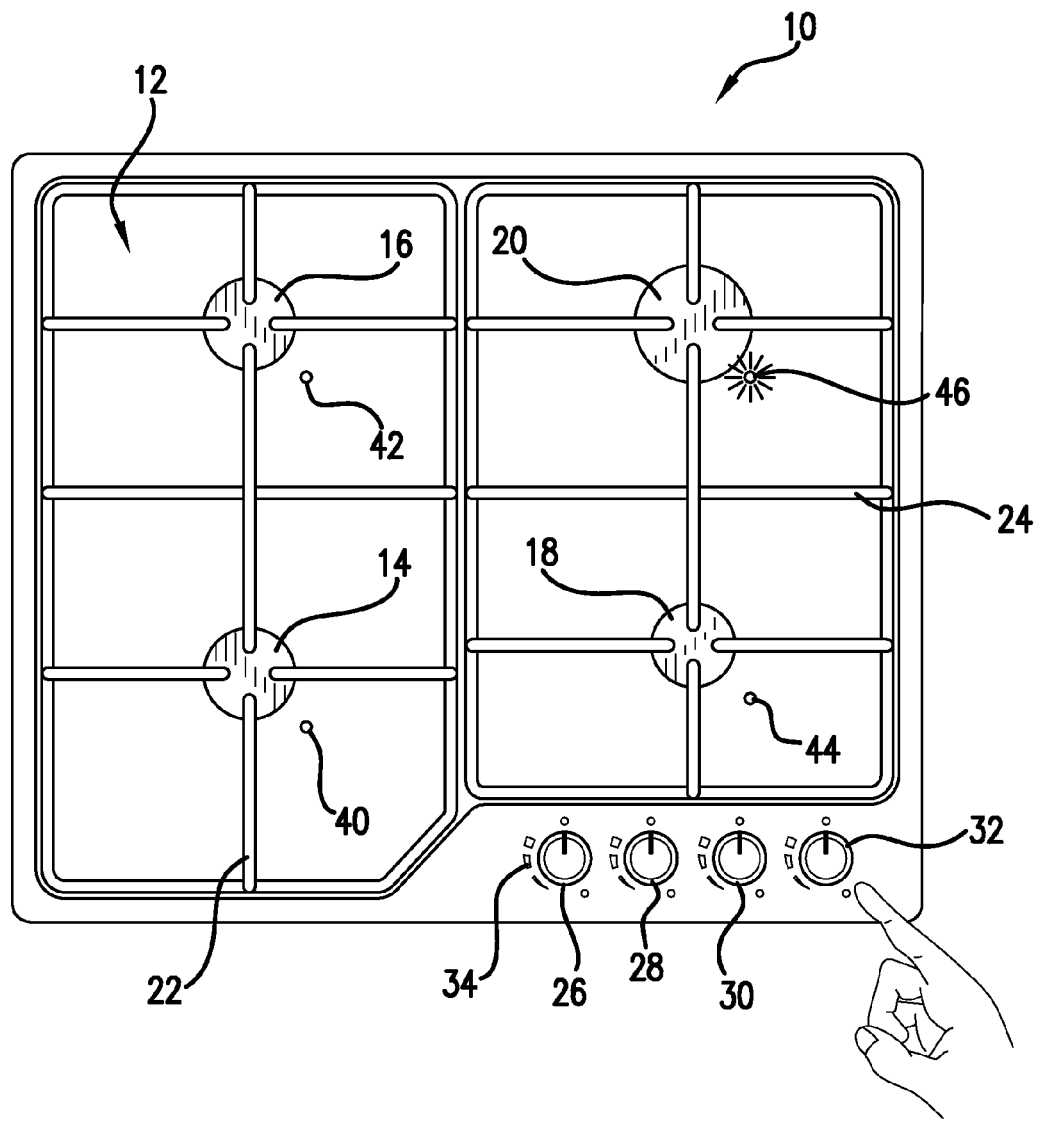
FIG. 2 provides a top view of the horizontal surface of another gas cook top appliance according to another exemplary embodiment of the present invention.

As shown in FIG. 1, visual indicators 40, 42, 44, and 46 are located at, and surround, their respective burners 14, 16, 18, and 20. In this way, a clear identification to the user is provided of the burner associated with a particular control. However, FIG. 1 illustrates just one exemplary embodiment of visual indicators 40, 42, 44, and 46. Referring now to FIG. 2, another exemplary embodiment visual indicators with cook-top appliance 10 is provided. More particularly, in FIG. 2, visual indicators 40, 42, 44, and 46 are located at respective burners 14, 16, 18, and 20 without encircling such burners. For example, upon detecting a user's hand at control 32, visual indicator 46 provides a signal visible to the user that burner 20 is associated with control 32. Accordingly, with the exemplary embodiments of FIGS. 1 and 2, the user is provided with convenient system for positively identifying which burner is controlled by a particular control on cook-top appliance 10.

As will be understood by one or ordinary skill in the art using the teachings discloser herein, other configurations for visual indicators 40, 42, 44, and 46 may be used as well. For example, such visual indicators could be configured to partly encircle the burners, could be formed as a straight-bar located at the burners, or otherwise configured in a variety of designs that would provide for a visible signal that positively identifies the burner associated with a particular control. Additionally, multiple visual indicators could be placed at each burner as well. For example, referring to FIG. 2 again, two visual indicators 46 could be placed on either side of burner 20 rather than one. Of course, other arrangements may be used as well.

Visual indicators 40, 42, 44, and 46 can be constructed from a variety of different devices. For example, each visual indicator could be constructed from one or more LEDS. Upon activation, the LEDS will emit a light visible to the user. Other visible light sources (and combinations thereof may be used as well including, for example, OLED, incandescent light, laser diode, neon light, fluorescent light, HID (high intensity discharge), cold cathode, and electroluminescent. In addition, multi-colored LEDS (e.g., multiple LEDS of different colors or a single LED that can produce different colors) could be used to emit light(s) including flashing light(s).

Additionally, such visual indicators 40, 42, 44, and 46 can be caused to provide a constant light when the user's hand is detected at the control. Alternatively, the visual indicator may flash or blink upon detection. In still another embodiment of the invention, the intensity of the light emitted by a visual indicator and/or the speed at which it blinks may vary as a function of how close the user is to the control. For example, a bright and/or rapidly flashing light could mean the user is close or in contact with the control 26, 28, 30, or 32—while a dimmer or slower flashing light might mean the user's presence is detected but is farther away.

As previously stated, one or more sensors are used to detect the presence of the user at controls 26, 28, 30, and/or 32. A variety of different sensor types may be used for purposes of detecting the presence of the user in close proximity to the control and/or in contact with the control. By way of example, the sensor(s) may be constructed from a capacitive touch sensor that uses the knob that forms part of controls 26, 28, 30, and 32 to create a field. As a user's hand approaches or contacts the knob, changes in e.g., the capacitance of the field are detected. Upon detecting such change, the sensor is configured to activate the appropriate visual indicator 14, 16, 18, or 20 by e.g., sending a signal to such indicator or to a processing device that then sends a signal to the appropriate visual indicator.

With the use of a capacitive touch sensor, in order to create the appropriate field at each of controls 26, 28, 30, and 32, it is important to prevent grounding of the control through the appliance or otherwise in order to properly detect the presence of the user. Accordingly, FIG. 3 provides an exemplary embodiment of a control that may be used to create a capacitive touch sensor. More particularly, for a gas burner, the control of FIG. 3 includes a valve 48 with a stem 50. Rotation of stem 50 is used to selectively adjust a heating element such as burners 14, 16, 18, or 20 by controlling the size of a passage in valve 48 through which gas flows. By way of example, for electric heating elements, valve 48 might be replaced with a rheostat (or other power control/regulation device) connected to stem 50.

Typically, valve 48 and/or its stem 50 will be constructed from a conductive material such as metal that would otherwise interfere with the creation of a proper field for detection of a user. Accordingly, stem 50 is equipped with an insulating or non-conductive boot 54. A receiving contact 52 is received into a groove 56 that is located on the exterior of non-conductive boot 54. Receiving contact 52 is connected by wire 53 to electronics used to create a capacitive field with conductive knob 66.

Boot 54 is positioned within opening 62 located in non-conductive knob insert 60. In turn, non-conductive knob insert 60 is positioned within a recess 70 of conductive knob 66. To communicate changes in the capacitance of a field at conductive knob 66 caused by contact with the user (or close proximity thereof), a sliding contact 64 is also positioned within opening 62 and is received into a recess 70 of conductive knob 66. Accordingly, sliding contact 64 places conductive knob 66 into contact with receiving contact 52. Furthermore, by attaching insert 60 and knob 66 together, the two can be readily removed from boot 54 for cleaning or service without removal of receiving contact 52 and its associated wire 53.

FIG. 4 provides another embodiment of a control as may be used to create a capacitive touch sensor. The embodiment of FIG. 4 is similar to that of FIG. 3 except that a non-conductive knob insert 60 is not used. More particularly, insulating boot 54 is received directly into an opening 74 in a conductive knob 72. The embodiments of FIGS. 3 and 4 are provided by way of example only; still other configurations for controls 26, 28, 30, and 32 as might be used to create a capacitive touch sensor may also be used as well.

The use of a capacitive touch sensor to detect the present of a user in contact with, or close proximity to, one or more of controls 26, 28, 30, and 32 is provided by way of example only. As will be understood using the teachings disclosed herein, other sensing techniques may be used as well. For example, cook-top appliance 10 could be configured with acoustical sensors that detect pressure waves caused by the movement of the user in close proximity to the control and/or caused by contact with the control. Upon detecting such a pressure wave, the visual indicator associated with such control would be activated. In addition, a sonar-like system could be used in which the control is equipped with an ultrasonic transducer capable of sending out an acoustic ping and then, based upon the return echo of the ping, determine the presence of a user.

Similarly, an optical sensor could also be used to detect the presence of a user. For example, photoelectric cells could be used to detect changes in visible light caused by the user's contact with, or close proximity to, the control. Still other detection techniques may be used as well with the present invention.

Accordingly, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance for cooking, comprising:
   a heating element positioned upon a top surface;
   a control associated with said heating element and configured for selective activation and adjustment of said heating element, wherein said control comprises
   a valve having a stem;
   a non-conductive boot, the stem of said valve received into said non-conductive boot;
   a conductive portion for contact with a user of the appliance, said conductive portion supported by said non-conductive boot and insulated from said valve, the appliance, or both;
   a receiving contact positioned upon said non-conductive boot, said receiving contact positioned into electrical contact with the conductive portion;
   a visual indicator positioned on the top surface; and
   a sensor configured to activate said visual indicator upon detecting the presence of a user at said control so as to identify said heating element as being associated with said control.

2. An appliance for cooking as in claim 1, wherein said sensor is configured to activate said visual indicator when the user contacts said control.

3. An appliance for cooking as in claim 1, wherein said sensor is configured to activate said visual indicator when the user comes into close proximity with said control.

4. An appliance for cooking as in claim 1, wherein said visual indicator is selected from the group comprising LED, OLED, incandescent light, laser diode, neon light, fluorescent light, HID, cold cathode, electroluminescent, or combinations thereof.

5. An appliance for cooking as in claim 1, wherein said visual indicator surrounds said heating element.

6. An appliance for cooking as in claim 1, wherein said visual indicator comprises a plurality of visual indicators that are positioned around said heating element.

7. An appliance for cooking as in claim 1, where said sensor comprises a capacitive sensor positioned on the appliance so as to detect a change in capacitance caused by a user contacting said control, coming into close proximity to said control, or a combination thereof.

8. An appliance for cooking as in claim 1, wherein said sensor comprises an acoustical sensor positioned on the appliance so as to detect a user contacting said control, coming into close proximity to said control, or a combination thereof.

9. An appliance for cooking as in claim 1, wherein said sensor comprises an optical sensor positioned on the appliance so as to detect a user contacting said control, coming into close proximity to said control, or a combination thereof.

10. An appliance for cooking as in claim 1, wherein said sensor comprises:
    a capacitive touch sensor configured to detect a change in the capacitance of a field at the control element caused by the presence of the user.

11. An appliance for cooking as in claim 1, wherein said control comprises a valve or a rheostat.

12. An appliance for cooking as in claim 1, further comprising
    a plurality of heating elements positioned upon the top surface;
    a plurality of controls, each associated with one of said plurality of heating elements and configured for selective adjustment of said respective heating element;
    a plurality of visual indicators, each placed adjacent to one of said heating elements; and a plurality of sensors, each configured to activate one of said visual indicators upon detecting the presence of a user at one of said controls so as to identify the said heating element associated with one of said controls.

13. An appliance for cooking as in claim 1, wherein said heating element comprises a gas burner.

14. An appliance for cooking as in claim 1, wherein said visual indicator is configured to blink, change in visual intensity, or both when said sensor detects the presence of a user at said control.

15. A cooking appliance, comprising:
- a heating element positioned upon a top surface of the appliance;
- a control associated with said heating element and configured for selective activation and adjustment of said heating element, wherein said control comprises:
  - a valve having a stem;
  - a non-conductive boot, the stem of said valve received into said non-conductive boot;
  - a knob comprising a conductive portion for contact with a user of the appliance, said knob supported by said non-conductive boot and insulated from said valve, the appliance, or both;
  - a receiving contact positioned upon said non-conductive boot, said receiving contact placed into electrical contact with the conductive portion of said knob when said knob is positioned onto said non-conductive boot;
- a visual indicator positioned separately on the top surface from said control and located adjacent to said heating element; and
- a sensor in communication with said receiving contact, said sensor configured to activate said visual indicator upon detecting the presence of a user at said control so as to identify said heating element as being associated with said control.

16. A cooking appliance as in claim 15, further comprising:
- a non-conductive knob insert defining an opening into which said non-conductive boot is received, wherein said knob defines a recess into which said non-conductive knob insert is received; and
- a sliding contact received into the opening of said non-conductive knob insert and received into the recess of said knob, said sliding contact configured for placing said knob in electrical contact with said receiving contact.

* * * * *